United States Patent
Gu et al.

(10) Patent No.: US 8,187,761 B2
(45) Date of Patent: May 29, 2012

(54) POWER SUPPLY APPARATUS AND METHOD FOR LINE CONNECTION TYPE FUEL CELL SYSTEM

(75) Inventors: Bon-Gwan Gu, Seoul (KR); Tae-Won Kim, Anyang-si (KR)

(73) Assignees: LG Electronics Inc., Seoul (KR); LG Chem, Ltd., Seoul (KR)

( * ) Notice: Subject to any disclaimer, the term of this patent is extended or adjusted under 35 U.S.C. 154(b) by 1157 days.

(21) Appl. No.: 11/565,835

(22) Filed: Dec. 1, 2006

(65) Prior Publication Data

US 2007/0128482 A1   Jun. 7, 2007

(30) Foreign Application Priority Data

Dec. 6, 2005 (KR) .................. 10-2005-0118399

(51) Int. Cl.
    *H01M 8/04* (2006.01)
(52) U.S. Cl. ......... 429/432; 429/429; 429/430; 429/900
(58) Field of Classification Search .............. 429/22, 429/429, 430, 432, 900
    See application file for complete search history.

(56) References Cited

U.S. PATENT DOCUMENTS

| | | | |
|---|---|---|---|
| 2002/0030365 A1 | 3/2002 | Underwood et al. | 290/40 |
| 2003/0143447 A1* | 7/2003 | Akimoto et al. | 429/23 |
| 2004/0219399 A1* | 11/2004 | Zhu et al. | 429/13 |
| 2005/0184594 A1* | 8/2005 | Fredette | 307/78 |
| 2005/0238945 A1 | 10/2005 | Fukuda et al. | |
| 2006/0051649 A1 | 3/2006 | Jeon et al. | |
| 2006/0292411 A1 | 12/2006 | Cho et al. | |

FOREIGN PATENT DOCUMENTS

| | | |
|---|---|---|
| EP | 1 191 659 A2 | 3/2002 |
| JP | 2001-357867 A | 12/2001 |
| JP | 2002050378 A * | 2/2002 |
| KR | 10-0568182 | 3/2006 |
| WO | WO 02/21659 A1 | 3/2002 |

OTHER PUBLICATIONS

Machine translation of KR 2005072328, Kim et al., Jul. 2005.*
Matsushita et al., Machine translation of JP 2002050378 A, Feb. 2002.*
Kake et al., Machine translation of JP 2001357867 A, Dec. 2001.*
U.S. Appl. No. 11/534,725 to Kim et al., which was filed on Sep. 25, 2006.
U.S. Appl. No. 11/565,891 to Gu et al., which was filed on Dec. 1, 2006.
English Language Abstract of KR 10-2005-0072328.
European Search Report dated Dec. 16, 2009 for Application No. 06 025 117.

* cited by examiner

*Primary Examiner* — Basia Ridley
*Assistant Examiner* — Sean P Cullen
(74) *Attorney, Agent, or Firm* — KED & Associates, LLP

(57) ABSTRACT

A power supply apparatus for a line connection type fuel cell system includes a power converter system (PCS) control power supply which generates PCS control power from line power, a balance of plant (BOP) power supply which generates BOP power from line power, a regulator which generates PCS control power from the BOP power, a first switching unit switched by a control signal, which directs the line power to one of the PCS control power supply and the BOP power supply, a second switching unit switched by a control signal, which selects an output of one of the PCS control power supply and the regulator to provide PCS control power, and a controller which controls switching of the first and second switching units in response to a starting command.

10 Claims, 3 Drawing Sheets

POWER SUPPLY APPARATUS AND METHOD FOR LINE CONNECTION TYPE FUEL CELL SYSTEM

RELATED APPLICATION

The present disclosure relates to subject matter contained in Korean Application No. 10-2005-0118399, filed on Dec. 6, 2005, which is herein expressly incorporated by reference in its entirety.

BACKGROUND OF THE INVENTION

1. Field of the Invention

The present invention relates to a fuel cell system, and more particularly, to a power supply apparatus and method for a line connection type fuel cell system which improves the operating efficiency of the fuel cell system by stably supplying power to a power converter system (PCS) control board when the fuel cell system is initially started.

2. Description of the Background Art

In general, a fuel cell is an apparatus which generates electric energy from fuel.

In an example of a fuel cell, an anode and a cathode are installed at both sides of a polymer electrolyte film. Electrochemical oxidation of hydrogen, which is a fuel, is generated at the anode (also referred to as an oxidation electrode), and electrochemical deoxidation of oxygen, which is an oxidizing agent, is generated at the cathode (also referred to as a deoxidation electrode).

The fuel cell generates electrons by the electrochemical oxidation and deoxidation, and generates electric energy by movement of the electrons.

Exemplary fuel cells include a phosphoric acid fuel cell, an alkaline fuel cell, a proton exchange membrane fuel cell, a molten carbonate fuel cell, a solid oxide fuel cell, and a direct methanol fuel cell.

Exemplary applications of fuel cells include a commercial fuel cell, a home fuel cell, a vehicle fuel cell for an electric vehicle, and a small-sized fuel cell for a portable terminal or a notebook computer.

The home fuel cell has been improved to efficiently operate an electric home appliance or a lighting apparatus in a house. The commercial fuel cell has been improved to efficiently operate a lighting apparatus, a motor or a machine in a shopping center or a factory.

A fuel cell system may connect to a line power supply system, such as that of an electric power utility. If power supplied by a fuel cell system to a load is deficient, the fuel cell system is supplied with the deficient quantity of power from the line power supply system. If power supplied by the fuel cell system to the load is excessive, the fuel cell system supplies the excess power to the line power supply system.

FIG. 1 is a block diagram illustrating a conventional power supply apparatus for a line connection type fuel cell system.

Referring to FIG. 1, the conventional power supply apparatus includes a fuel cell 1, a DC/DC converting unit 2, an inverter 3, a line power supplying unit 4, a balance of plant (BOP) power supplying unit 5, and a power converter system (PCS) control power supplying unit 6.

A rectifier in the inverter 3 (not shown), converts AC line power outputted from the line power supplying unit 4 into DC line power. When the fuel cell system is initially started, the BOP power supplying unit 5 receives the DC line power, converts the DC line power into BOP power having a predetermined voltage level, and supplies the BOP power to BOP components of the fuel cell system.

Exemplary BOP components include an air supplying device (such as, but not limited to, for example, a compressor, pump, etc.) which supplies oxygen to the fuel cell 1, and a fuel supplying device which supplies fuel to the fuel cell 1.

The fuel cell 1 generates DC power by reacting the oxygen from the air supplying device (not shown) and fuel from the fuel supplying device (not shown).

The DC/DC converting unit 2 boosts the voltage of the DC power generated by the fuel cell 1, and outputs the boosted DC power.

The inverter 3 converts the DC power outputted from the DC/DC converting unit 2 into an AC power, and supplies the AC power to at least one load.

A triac Tr, which is turned off when the fuel cell system initially starts and is turned on after the fuel cell system starts, and a charging resistor CR, which is connected in parallel to the triac Tr to control charging of a DC link voltage, are connected between an output terminal of the inverter 3 and a line power line.

During initial starting, the PCS control power supplying unit 6 receives the DC line power, converts the DC line power into PCS control power having a predetermined voltage level, and supplies the PCS control power to a PCS control board (not shown) as operating power.

The operation of the conventional power supply apparatus for the line connection type fuel cell system will now be explained.

A controller (not shown) turns off the triac Tr according to a starting command of the fuel cell system. Then, the line power, outputted by the line power supplying unit 4, passes through the charging resistor CR and is supplied to the rectifier in the inverter 3. The rectifier converts the AC line power to DC line power, and supplies the DC line power to a DC link capacitor C to charge the DC link capacitor C.

After the DC link capacitor C is charged to some degree, the BOP power supplying unit 5 receives the DC line power, converts the DC line power to a BOP power having a predetermined voltage level, and supplies the BOP power to BOP components of the fuel cell system.

The PCS control power supplying unit 6 also receives the DC line power, converts the DC line power to a PCS control power having a predetermined voltage level, and supplies the PCS control power to the PCS control board.

Accordingly, the BOP components and the PCS control board are provided with power to generate electricity in the fuel cell 1.

That is, the fuel cell 1 receives fuel and air from the BOP components (not shown), and the fuel and air react together to generate DC power.

Thereafter, the DC/DC converting unit 2 boosts the voltage of the DC power generated by the fuel cell 1, and outputs the boosted DC power to the inverter 3. The inverter 3 converts the DC power outputted by the DC/DC converting unit 2 into an AC power, and supplies the AC power to the load.

A controller (not shown) monitors whether the DC power has been generated by the fuel cell 1. If the controller senses the DC power, the controller makes the triac Tr conductive, thereby transmitting the AC power from the inverter 3 to the load through the conductive triac Tr.

However, the conventional power supply apparatus must charge the DC link capacitor C, which has a large capacitance, when the fuel cell system is initially started, which requires a charging resistor with a large resistance. Accordingly, a large current flows in a short time in the initial starting, thereby shorting out the charging resistor.

In addition, when the DC link capacitor C is charging, power is supplied to the PCS control board, which causes mis-operations of the PCS control board,

SUMMARY OF THE INVENTION

Therefore, a feature of the present invention is a power supply apparatus and method for a line connection type fuel cell system which can supply operating power and control power to a fuel cell system without a charging resistor.

Another feature of the present invention is a power supply apparatus and method for a line connection type fuel cell system which can prevent a PCS control board from being erroneously operated in initial starting, by supplying stable power to the PCS control board before supplying power to BOP components, when initially starting the fuel cell system.

To achieve at least these features, there is provided a power supply apparatus for a line connection type fuel cell system which includes a power converter system (PCS) control power supply which generates PCS control power from line power, a balance of plant (BOP) power supply which generates BOP power from line power, a regulator which generates PCS control power from the BOP power, a first switching unit switched by a control signal, which directs the line power to one of the PCS control power supply and the BOP power supply, a second switching unit switched by a control signal, which selects an output of one of the PCS control power supply and the regulator to provide PCS control power, and a controller which controls switching of the first and second switching units in response to a starting command.

When the starting command is generated, the controller may turn off the first switching unit. When the starting command is generated, the controller may output a control signal which controls the second switching unit to connect an output terminal of the PCS control power supply to a PCS control board.

When DC power is generated in a fuel cell, the controller may make the first switching unit conductive. When DC power is generated in the fuel cell, the controller may output a control signal which controls the second switching unit to connect an output terminal of the regulator to a PCS control board.

The PCS control power supply may convert a DC line power to a PCS control power having a predetermined DC voltage level. The BOP power supply may convert a DC line power into BOP power having a predetermined DC voltage level.

There is also provided a power supply apparatus for a line connection type fuel cell system which includes a charging unit which converts AC line power to DC line power, a PCS control power supply which generates PCS control power from the DC line power, a BOP power supply which generates BOP power from line power, a switching unit switched by a control signal, which directs the AC line power towards one of the PCS control power supply and the BOP power supply, and a controller which outputs the control signal to control switching of the switching unit based on generation of the PCS control power.

When a starting command is generated, the controller may turn off the switching unit, directing the AC line power to the charging unit. When PCS control power is generated by the PCS control power supply, the controller may make the switching unit conductive, directing the AC line power towards the BOP power supplying unit.

The PCS control power supplying unit may convert the DC line power into PCS control power having a predetermined DC voltage level. The BOP power supply may convert DC line power into BOP power having a predetermined DC voltage level.

There is also provided a power supply method for a line connection type fuel cell system which includes generating PCS control power from line power when a starting command is generated, generating BOP power from the line power, supplying the BOP power to a fuel cell to generate DC power, and generating BOP power and PCS control power from the DC power generated by the fuel cell.

The power supply method may also include changing a voltage level of the DC power generated by the fuel cell to a predetermined voltage level, where the BOP power and PCS control power are generated based on the predetermined voltage level. The power supply method may also include regulating the generated BOP power, where the PCS control power is generated from the regulated BOP power.

Generating the PCS control power from the line power may include converting the line power into a DC power having a predetermined voltage level. Generating the BOP power from the line power may include converting the line power into a DC power having a predetermined voltage level.

There is also provided a power supply method for a line connection type fuel cell system which includes generating PCS control power from line power, generating BOP power from the line power, supplying the BOP power to a fuel cell to generate DC power, and generating BOP power and PCS control power from the DC power generated by the fuel cell.

The power supply method may include changing a voltage level of the DC power generated by the fuel cell to a predetermined voltage level, where the BOP power and PCS control power are generated based on the predetermined voltage level. The power supply method may also include regulating the generated BOP power, where the PCS control power is generated from the regulated BOP power.

The power supply method may also include converting the line power to a DC line power, where generating the PCS control power from the line power includes converting the DC line power to PCS control power having a predetermined DC voltage level. Generating the BOP power from the line power may include converting a line power to BOP power having a predetermined DC voltage level.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to preferred embodiments of the present invention, examples of which are illustrated in the accompanying drawings.

A power supply apparatus and method for a line connection type fuel cell system which can improve reliability of the fuel cell system will now be described in detail with reference to the accompanying drawings.

Figure 1:
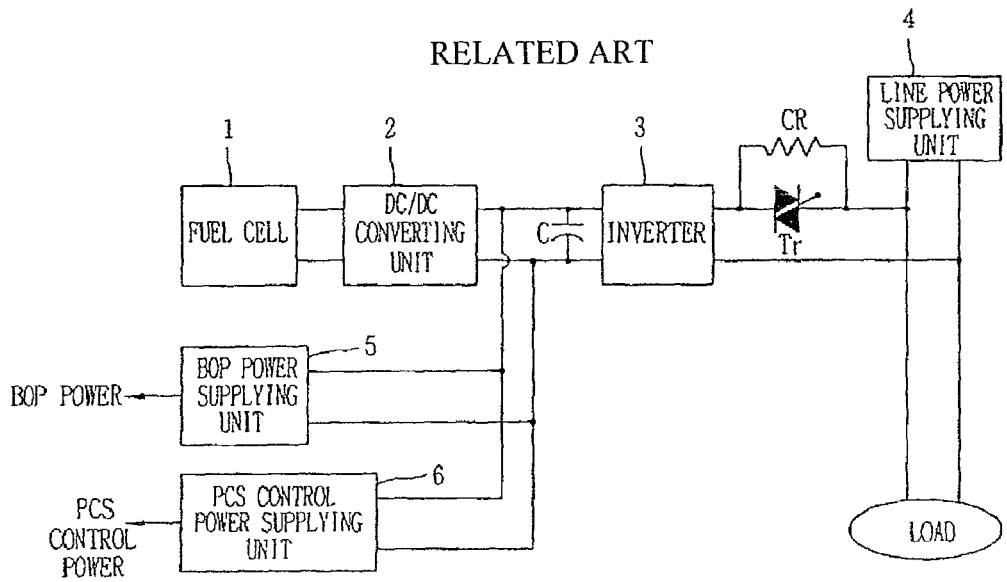
FIG. 1 is a block diagram illustrating a conventional power supply apparatus for a line connection type fuel cell system.
Figure 2:
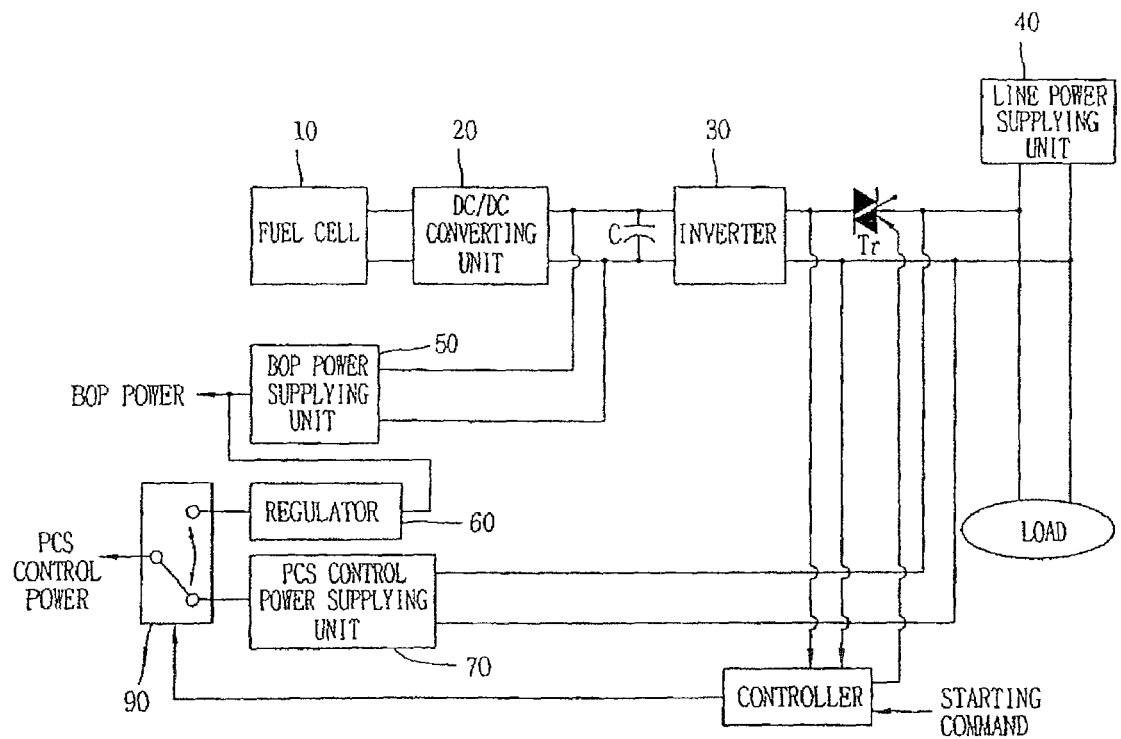
FIG. 2 is a block diagram illustrating a power supply apparatus for a line connection type fuel cell system in accordance with a first embodiment of the present invention.

FIG. 2 is a block diagram illustrating a power supply apparatus for a line connection type fuel cell system in accordance with a first embodiment of the present invention.

As illustrated in FIG. 2, the power supply apparatus includes a fuel cell 10, a DC/DC converting unit 20, an inverter 30, a line power supplying unit 40, a triac Tr, a switching unit 90, a controller 80, a BOP power supplying unit 50, and a regulator 60.

The fuel cell 10 includes a stack (not shown) comprised of an anode and a cathode which generates electricity by electrochemical reactions of hydrogen and oxygen, and generates DC power from the stack (not shown).

The DC/DC converting unit 20 changes the voltage of the DC power outputted by the fuel cell 10 (i.e., boosts or lowers the voltage).

The inverter 30 converts the DC power outputted by the DC/DC converting unit 20 into AC power, and supplies the AC power to at least one load.

The inverter 30 includes a rectifier which converts AC line power from the line power supplying unit 40 into DC line power, and supplies the DC line power to the BOP power supplying unit 50 through a DC link capacitor C when the fuel cell system is initial started.

The line power supplying unit 40 generates AC line power and supplies the AC line power to the fuel cell system and each load.

The BOP power supplying unit 50 receives the DC line power through the triac Tr when the fuel cell system is initial started, converts the DC line power into BOP power having a predetermined DC voltage, and supplies the BOP power to at least one BOP component of the fuel cell system. When the fuel cell 10 outputs DC power, the BOP power supplying unit 50 converts the DC power outputted by the fuel cell into BOP power, and supplies the BOP power to BOP components.

The regulator 60 changes (i.e., boosts or lowers) the voltage of the BOP power outputted by the BOP power supplying unit 50 to a predetermined level to generate PCS control power, and supplies the PCS control power to a PCS control board.

The PCS control power supplying unit 70 converts AC line power into PCS control power having a predetermined DC voltage level, and supplies the PCS control power to the PCS control board.

The switching unit 90 is switched by a control signal, to connect an output terminal of the regulator 60 or an output terminal of the PCS control power supplying unit 70 to the PCS control board.

That is, the switching unit 90 is switched by the control signal, to select either the PCS control power outputted from the regulator 60 or the PCS control power outputted from the PCS control power supplying unit 70.

The controller 80 is powered by the PCS control power, and controls switching of the triac Tr and the switching unit 90.

When a starting command is generated, the controller 80 turns off the triac Tr, and outputs a control signal to control the switching unit 90 to connect the output terminal of the PCS control power supplying unit 70 to the PCS control board.

In addition, when sensing generation of DC power by the fuel cell 10, the controller 80 makes the triac Tr conductive, and outputs a control signal to control the switching unit 90 to connect the output terminal of the regulator 60 to the PCS control board.

Figure 3:
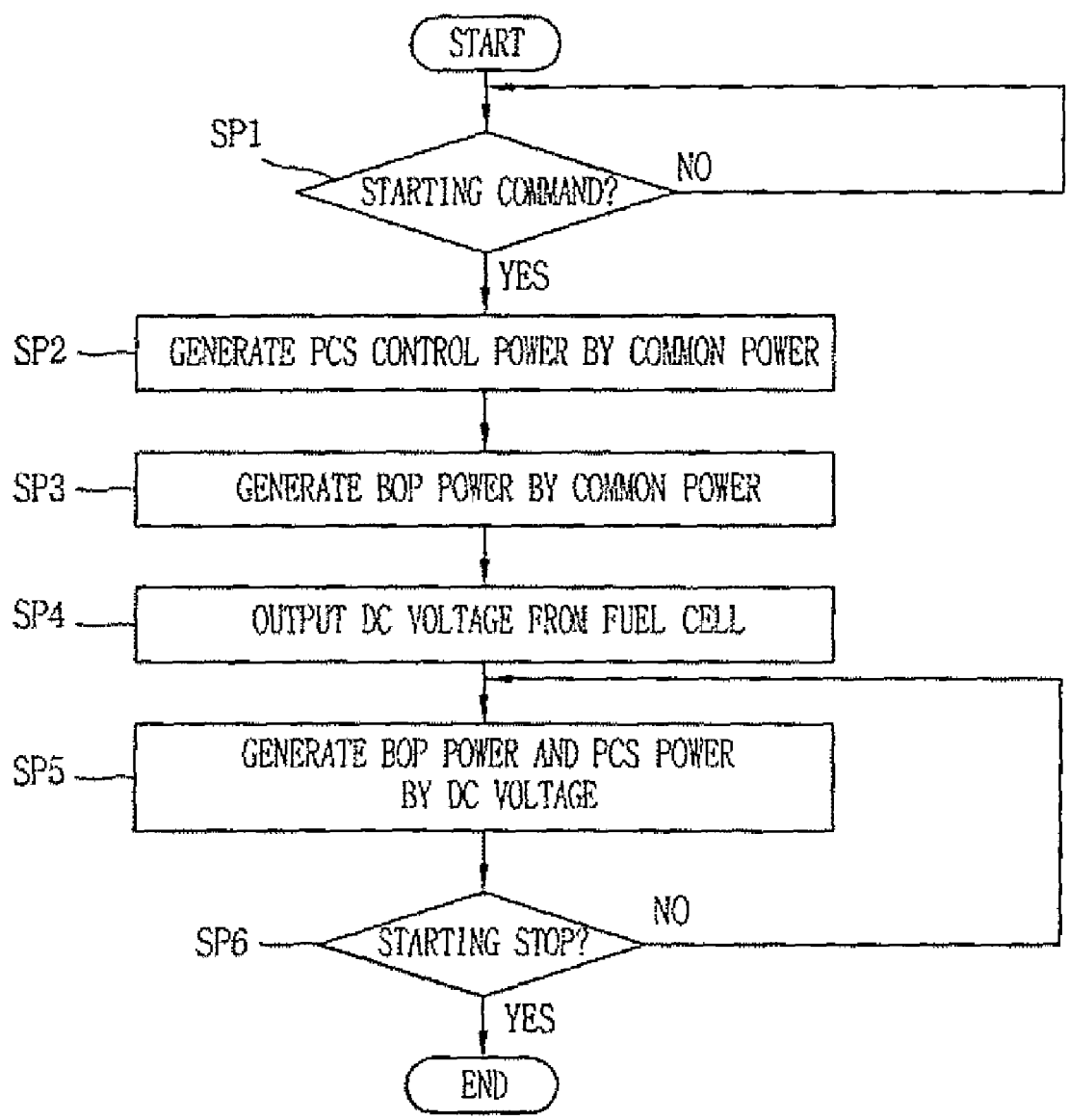
FIG. 3 is a flowchart showing a power supply method for a line connection type fuel cell system in accordance with an embodiment of the present invention.

The operation of the power supply apparatus for the line connection type fuel cell system in accordance with the first embodiment of the present invention will now be described with reference to FIG. 3.

When the starting command is generated (SP1), the controller 80 turns off the triac Tr, thereby preventing line power from the AC line power supplying unit 40 from being transmitted to the inverter 30.

The PCS control power supplying unit 70 converts the AC line power from the line power supplying unit 40 into a PCS control power having a predetermined DC voltage level, and outputs the PCS control power.

Here, the controller 80 switches the switching unit 90 to connect the PCS control power supplying unit 70 to the PCS control board. Therefore, the PCS power from the PCS control power supplying unit 70 is supplied as operating power of the PCS control board (SP2).

Thereafter, the controller 80 makes the triac Tr conductive, and switches the switching unit 90 to connect the output terminal of the regulator 60 to the PCS control board.

The rectifier in the inverter 30 converts the AC line power from the line power supplying unit 40 to a DC line power, and the BOP power supplying unit 50 receives the DC line power through the DC link capacitor C, changes the voltage level of the DC line power to a predetermined DC voltage level, and supplies the DC power having the changed DC voltage level as BOP power to BOP components (SP3).

The fuel cell system is driven by the BOP power, to generate the DC voltage in the fuel cell 10 (SP4).

The DC/DC converting unit 20 changes the voltage of the DC power generated by the fuel cell 10, and applies the changed DC voltage to the inverter 30. The inverter 30 converts the DC power from the DC/DC converting unit 20 into an AC power, and applies the AC power to each load.

When sensing the AC power from the inverter 30, the controller 80 regards the current state as a normal state, and switches the switching unit 90 to connect the regulator 60 to the PCS control board.

The BOP power supplying unit 50 changes the voltage of the DC power outputted by the DC/DC converting unit 20 to a predetermined voltage level, supplies the changed DC power as BOP power to the BOP components, and supplies the BOP power to the regulator 60 (SP5).

The regulator 60 converts the BOP power into a PCS power having a predetermined DC voltage level, and supplies the PCS power to the PCS control board through the switching unit 90. This continues until a stop command is received (SP6).

Figure 4:
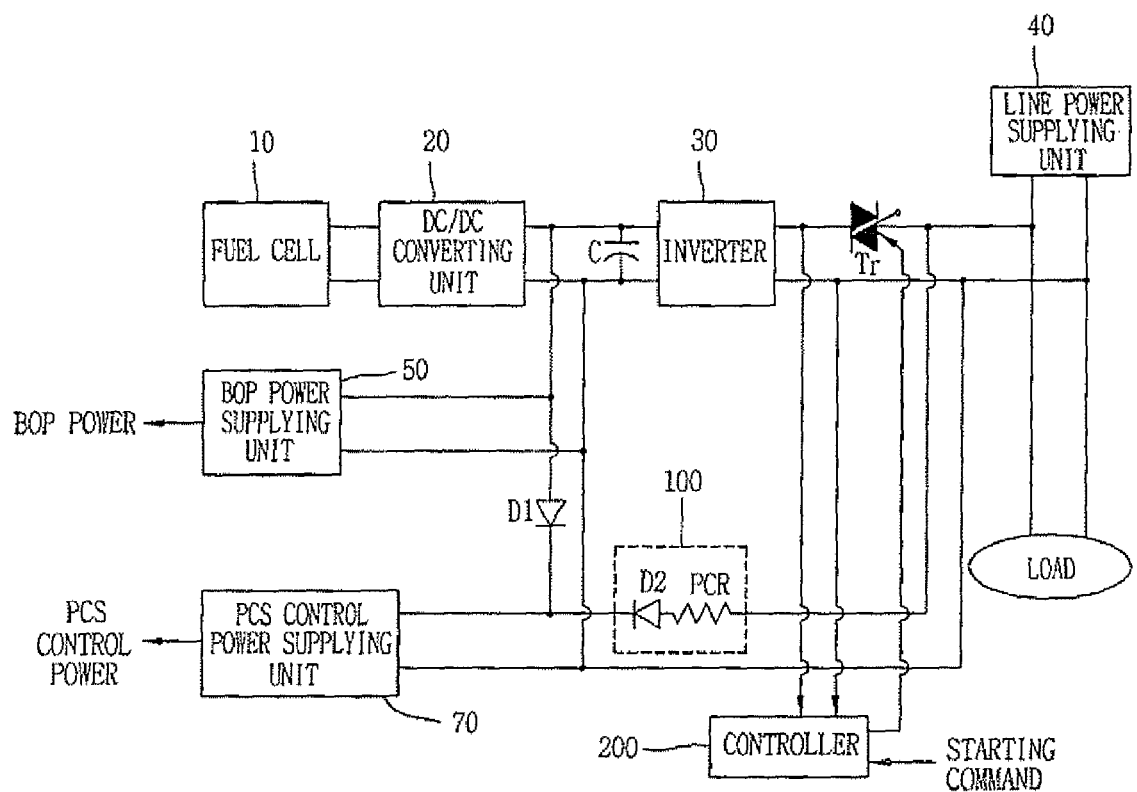
FIG. 4 is a block diagram illustrating a power supply apparatus for a line connection type fuel cell system in accordance with a second embodiment of the present invention.

FIG. 4 is a block diagram illustrating a power supply apparatus for a line connection type fuel cell system in accordance with a second embodiment of the present invention.

As shown in FIG. 4, the power supply apparatus includes a line power supplying unit 40 which supplies AC line power, a charging unit 100 which converts the AC line power to a DC line power with a limited current, a PCS control power supplying unit 70 which converts the DC line power into PCS control power having a predetermined DC voltage level, and supplies the PCS control power to a PCS control board, a BOP power supplying unit 50 which converts DC line power into BOP power having a predetermined DC voltage level, and supplies the BOP power to BOP components, a triac Tr switched by a control signal which directs the AC line power from the line power supplying unit 40 to the PCS control power supplying unit 70 or the BOP power supplying unit 50, and a controller 200 which controls switching of the triac Tr according to generation of the PCS control power.

The charging unit 100 includes a charging resistor PCR which limits the current passing to a charging capacitor (not shown) in the PCS control power supplying unit 70. The charging resistor PCR has a much smaller resistance than a conventional general charging resistor.

The operation of the power supply apparatus for the line connection type fuel cell system in accordance with the second embodiment of the present invention will now be described.

When a starting command is generated, the controller 200 turns off the triac Tr (rendering it non-conductive), thereby directing the line power from the line power supplying unit 40 to the PCS control power supplying unit 70 through the charging unit 100. A diode 92 of the charging unit 100 converts the AC line power into DC line power.

The PCS control power supplying unit 70 converts the DC line power into a PCS control power having a predetermined DC voltage level, and supplies the PCS control power to the PCS control board.

After the PCS control power supplying unit 70 generates the PCS control power, the controller 200 turns on the triac Tr (rendering it conductive).

The line power then passes to the inverter 30, where it is converted to a DC line power by a rectifier in the inverter 30. The BOP power supplying unit 50 receives the DC line power through the DC link capacitor C, converts the DC line power into BOP power having a predetermined voltage level, and supplies the BOP power to BOP components (not shown).

The fuel cell system is driven by the BOP power, to generate DC power by the fuel cell 10. The DC/DC converting unit 20 changes the voltage of the DC power generated by the fuel cell 10, and outputs the changes DC power to the inverter 30.

The inverter 30 converts the DC power outputted by the DOC/DC converting unit 20 into an AC power, and supplies the AC power to each load.

Further, the PCS control power supplying unit 70 converts the DC power outputted by the DC/DC converting unit 20 into PCS control power having a predetermined DC voltage level, and supplies the PCS control power to the PCS control board (not shown).

Thus, the power supply apparatus and method described above can supply operating power and control power to a fuel cell system without a charging resistor.

The power supply apparatus and method can also prevent a PCS control board from being erroneously operated in an initial starting, by supplying stable power to the PCS control board before supplying power to BOP components, when initially starting the fuel cell system.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A power supply apparatus for a line connection type fuel cell system, comprising:
   a fuel cell to generate a DC voltage;
   a converter to boost the DC voltage generated from the fuel cell;
   an inverter to convert the DC voltage from the converter into an AC voltage to apply the AC voltage to at least one load;
   a power converter system (PCS) control power supply which generates PCS control power from line power;
   a balance of plant (BOP) power supply which generates BOP power from line power;
   a regulator which generates PCS control power from the BOP power;
   a first switch coupled between the inverter and a power source, the first switch to direct the line power to one of the PCS control power supply or the BOP power supply;
   a second switch to switch an output of one of the PCS control power supply or the regulator to provide PCS control power; and
   a controller programmed to control switching of the first and second switches in response to a starting command,
   wherein, when the starting command is generated, the controller turns off the first switch and controls the second switch to couple an output terminal of the PCS control power supply to a PCS control board, and
   wherein, when the DC power is generated in the fuel cell, the controller turns on the first switch and controls the second switch to couple an output terminal of the regulator to a PCS control board.

2. The power supply apparatus as claimed in claim 1, wherein the PCS control power supply converts a DC line power to a PCS control power having a predetermined DC voltage level.

3. The power supply apparatus as claimed in claim 1, wherein the BOP power supply converts a DC line power into BOP power having a predetermined DC voltage level.

4. The power supply apparatus as claimed in claim 1, wherein the second switch is coupled of the PCS control power supply or the regulator.

5. The power supply apparatus as claimed in claim 4, wherein the second switch switches to receive an output of the PCS control power supply when the second control signal is in a first state and switches to receive an output of the regulator when the second control signal is in a second state.

6. The power supply apparatus as claimed in claim 5, wherein the regulator regulates power from the BOP power supply and outputs the regulated power through the second switch when the second control signal is in the second state.

7. A power supply method for a line connection type fuel cell system, comprising:
   generating power converter system (PCS) control power from line power when a starting command is generated;
   generating balance of plant (BOP) power from the line power when a starting command is generated;
   supplying the BOP power to a fuel cell to generate DC power;
   converting the DC voltage from the fuel cell into an AC voltage;
   detecting the AC voltage;
   generating BOP power from the DC power generated by the fuel cell when the AC voltage is detected,
   regulating the generated BOP power; and
   generating PCS control power from the regulated BOP power.

8. The power supply method as claimed in claim 7, further comprising
   changing a voltage level of the DC power generated by the fuel cell to a predetermined voltage level, wherein the BOP power and PCS control power is generated based on the predetermined voltage level.

9. The power supply method as claimed in claim 7, wherein generating the PCS control power from the line power comprises converting the line power into a DC power having a predetermined voltage level.

10. The power supply method as claimed in claim 7, wherein generating the BOP power from the line power comprises converting the line power into a DC power having a predetermined voltage level.

* * * * *